E. H. HOPPER.
GEARING.
APPLICATION FILED JAN. 5, 1922.

1,438,307.

Patented Dec. 12, 1922.
2 SHEETS—SHEET 1.

Inventor,
Earnest H. Hopper
By Geo. A. Hamlin
his Atty

E. H. HOPPER.
GEARING.
APPLICATION FILED JAN. 5, 1922.

1,438,307.

Patented Dec. 12, 1922.
2 SHEETS—SHEET 2.

Inventor,
Earnest H. Hopper
By [signature]
his Atty

Patented Dec. 12, 1922.

1,438,307

UNITED STATES PATENT OFFICE.

EARNEST H. HOPPER, OF MIDVALE, IDAHO.

GEARING.

Application filed January 5, 1922. Serial No. 527,062.

*To all whom it may concern:*

Be it known that I, EARNEST H. HOPPER, a native born citizen of the United States, residing at Midvale, in the county of Washington and State of Idaho, have invented certain new and useful Improvements in Gearing, of which the following is a specification.

This invention relates to gearing and, more particularly, to transmission gearing for use on automobiles wherein a shiftable gear pinion is employed to transfer the power from the stepped set of gears driven by the engine to the stepped set of gears for driving the shaft to the differential.

My improvements reside in the mounting for the pinion and means for shifting and locking it as will appear more fully hereinafter.

I am aware that modifications may be resorted to in carrying out the principles of my invention and I do not, therefore, limit the invention to the details of construction hereinafter described and which are shown in the accompanying drawings, except where so stated in the claims.

In the accompanying drawings:

Fig. 4 is a detail view showing the means for locking the frames.

Figure 1:
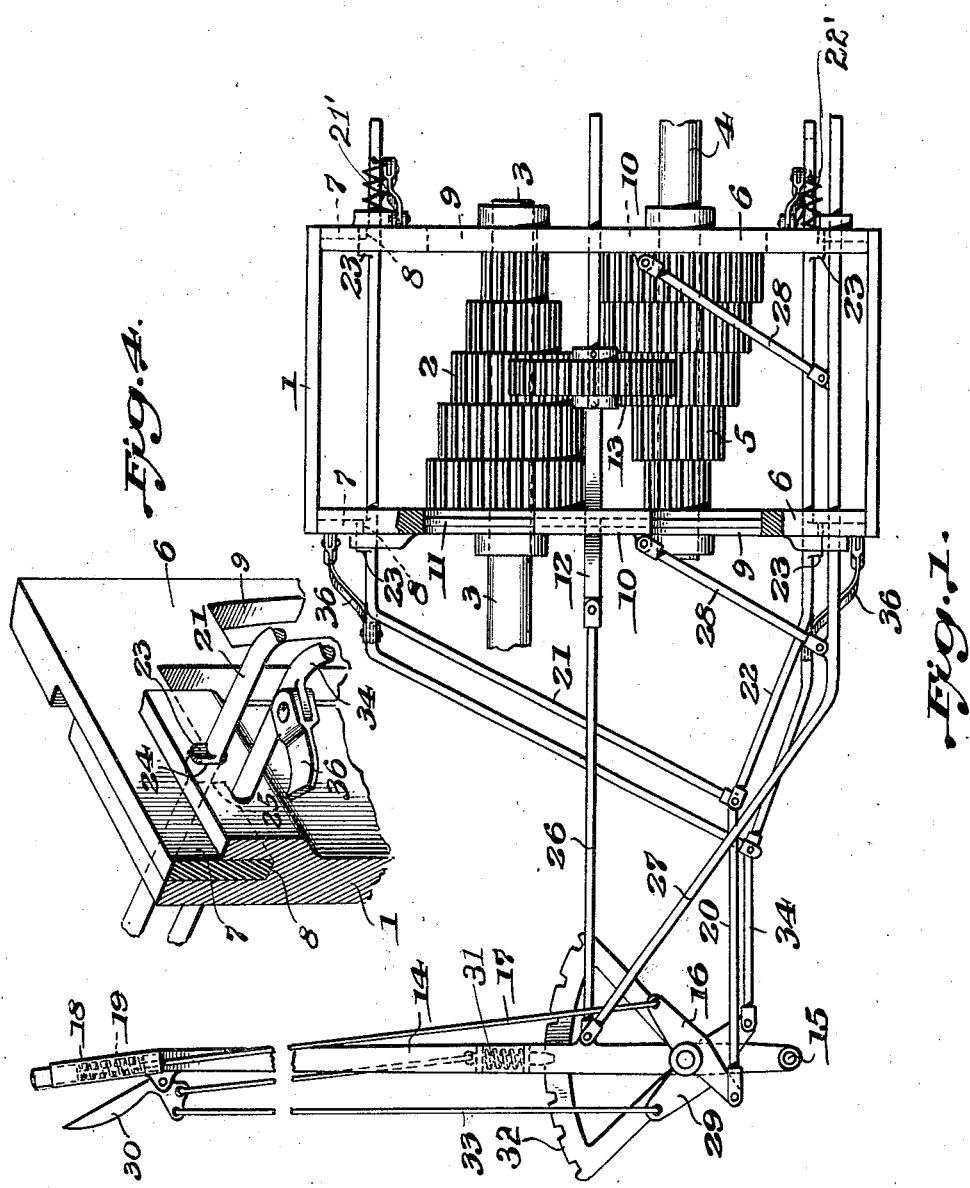
Figure 1 is a side elevation, certain parts being broken away.
Figure 2:
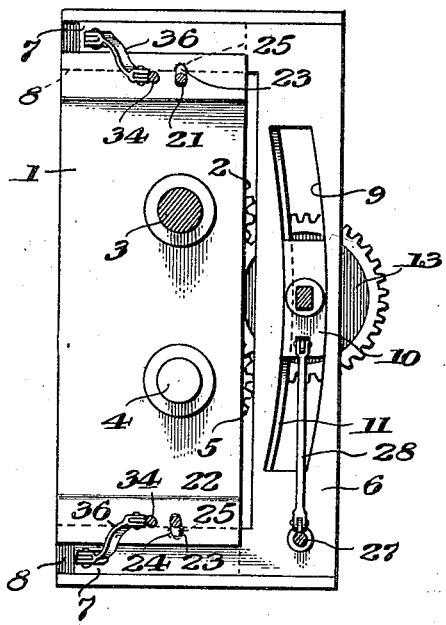
Fig. 2 is an end elevation at the left of Fig. 1.
Figure 3:
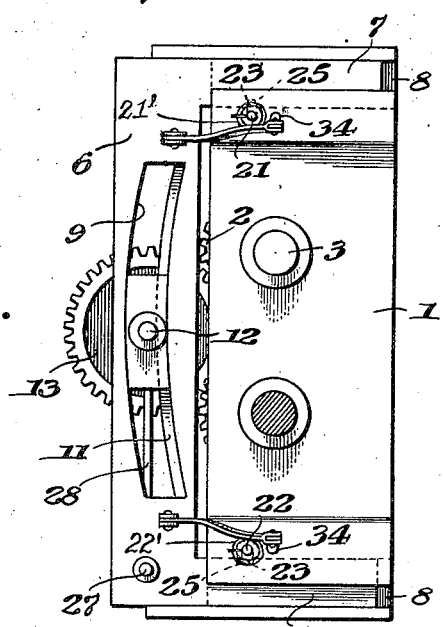
Fig. 3 is an end elevation taken at the right of Fig. 1.

The gear box is shown at 1, the gears which are driven by the engine are shown at 2 as carried by a suitable shaft 3 mounted in the gear box; and the gears which are carried by the transmission shaft 4 are shown at 5, said gears being arranged in reverse position as to diameter, in relation to the gears 2.

The frames which carry the transmission pinion are shown at 6, said frames having slides 7 which are movable in guides or ways 8 on the box 1 so that said frames 6 are adapted to be shifted transversely or crosswise in relation to the gears 2 and 5.

The frames are provided with arc-shaped slots 9; and they are slidable in the direction of the length of the slots for the arc-shaped bearings 10 whose surfaces conform to the slots 9 and which are prevented from becoming displaced therefrom by any suitable means as, for instance, the rib and groove arrangement 11.

Slidable through the bearings 10 is a shaft 12 which has a key or squared part fitting in a correspondingly shaped opening in one of the bearings and a cylindrical part slidable through the other bearing 10.

The transmission or intermediate gear pinion 13 is loosely mounted on the cylindrical part of the shaft 12 and adapted to mesh with the different gears of the sets 2 and 5.

By sliding the shaft 12 in the direction of its length, the pinion 13 will be brought opposite any desired sets of the gears 2 and 5 but in order to effect this sliding action it is necessary to first shift the frames 6 so that the pinion will first clear the gears and then be brought into mesh with the teeth thereof. Means are provided for effecting both of these movements as well as for locking the frames 6 in their adjusted positions and also holding the shaft 12.

I am aware that different instrumentalities may be employed for the foregoing purposes and I have shown only one arrangement for effecting these operations, so that it is to be understood that other shifting arrangements may be employed although the shifting devices described embody certain improvements for that purpose. A lever 14 which is pivoted at 15, carries the means for carrying out the operations required. Pivoted to the lever is a rocker 16 which is operated by a rod or wire 17 and a handle 18, there being provided a coil spring 19. From the rocker extends a connecting rod 20 which is secured to slide rods 21, 22 (actuated by springs 21', 22'), bearing locking keys 23, said rods being mounted in the gear box 1 and the keys 23 being adapted to enter, or be removed from, slots 24 for the purpose of engaging notches 25 in the slidable parts 7 so that the frames 6 will be locked with the pinion 13 in engagement with the gears 2 and 3, or may be released to enable them to be adjusted when the pinion 13 is to be engaged with other gears of the sets 2 and 5.

A rod 26 connects the lever 14 to the shaft 12 for the purpose of shifting said shaft and, consequently, pinion 13.

Another rod 27 connected to the lever 14 has links 28 jointed to the bearings 10, for the purpose of shifting the bearings 10, and hence the shaft 12 in the slots 9. Consequently, when the lever 14 is moved it not only shifts the pinion 13 for the purpose of positioning it to engage other gears of the sets 2 and 5 but it also shifts the shaft 12 bodily transversely of itself to insure meshing of the pinion 13 with the selected gears of said sets 2 and 5.

It is, however, necessary to shift the frames 6 so that the pinion 13 will clear the gears 2 and 5 before it re-meshes with the new set selected. For that purpose, there is provided an additional mechanism, comprising a rocker 29 carried by the lever 14 which is operated by a handle 30 pivoted to said lever. Said handle is locked by the provision of a spring actuated latch 31 which is adapted to engage different teeth of a locking rack 32 and is connected to the handle 30 by a rod 33. The rocker 29 is connected to rods 34 which are slidable in the gear box 1 and have links 36 connected to the slide 7 of the frames 6 by operating the handle 30; the frames 6 are slid backwardly or forwardly for the purpose heretofore described.

With my gearing power may be increased as the speed is diminished, or vice versa, by the operation of the pinion 13 under the control of the different mechanisms hereinbefore described.

I claim:

1. In a gearing the combination with sets of gears of different diameters, of a pinion adapted to act as an intermediary gear for transmitting the drive from one set of gears to the other, a frame which is movable transversely to the axes of said gears, means for shifting said frame as aforesaid, bearings movably mounted on said frame, means for shifting said bearings, a shaft carrying said pinion, said shaft being slidably carried by the bearings, and means for shifting said shaft.

2. In a gearing the combination with sets of gears of different diameters, of a pinion adapted to act as an intermediary gear for transmitting the drive from one set of gears to the other, a frame which is movable transversely to the axes of said gears, a pivoted lever, a handle carried thereby, operative connections between the handle and the frame whereby on moving said handle said frame may be shifted, bearings movably mounted on said frame, operative connections between the bearings and lever whereby the shifting of the lever will move the bearings, an operative connection between the shaft and the lever, and mechanism carried by the lever adapted for locking the frame.

In testimony whereof I affix my signature.

EARNEST H. HOPPER.